L. P. JEANNE.
EAR RING.

No. 180,887. Patented Aug. 8, 1876.

WITNESSES:
John Goethals
Alex F. Roberts

INVENTOR:
L. P. Jeanne
BY
ATTORNEYS.

UNITED STATES PATENT OFFICE.

LEON P. JEANNE, OF NEW YORK, N. Y.

IMPROVEMENT IN EAR-RINGS.

Specification forming part of Letters Patent No. 180,887, dated August 8, 1876; application filed May 22, 1876.

*To all whom it may concern:*

Figure 1:
Figure 2:
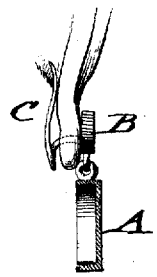

Be it known that I, LEON P. JEANNE, of the city, county, and State of New York, have invented a new and Improved Ear-Ring, of which the following is a specification:

Figure 1 represents a front view, and Fig. 2 a side view, of my improved ear-ring, showing mode of attachment to the ear.

Similar letters of reference indicate corresponding parts.

The object of my invention is to produce an improved kind of ear-ring, that is brought up close to the lower part of the ear, and securely retained therein, without dropping forward or sagging by the weight of the drop or the hook part.

The invention consists of a spring-lever hook, attached to a knob or button of the ear-ring or drop, and bent upward, so as to bear on the ear, and retain the button securely in position.

In the drawing, A represents an ear-ring or drop of any suitable design, which is applied to the ear by a front stud, button, or knob, B, and rear spring-hook C, for the purpose of bringing the entire ring or drop as close to the ear as possible, so as to avoid the loose and annoying swinging of the same.

The spring-lever hook C is first bent downward, then curved upward in the shape of an S, so as to bear by its upper spring end on the rear of the ear, and prevent not only the detaching of the ear-ring, but also the forward tilting or sagging, which would be the case by using the common suspension-hook.

The spring-lever hook C bears lightly, yet firmly, on the ear, and admits the ready putting in and taking out, the hook being readily slipped through the ear-hole, and turned at the same time in an upward direction, until the front button is in the required position.

Short ear-rings may thus be reliably applied to the ear without screws or other attachment.

Having thus described my invention, I claim as new and desire to secure by Letters Patent—

The improvement in ear-rings, consisting of the button B, for pressing the front of the ear, in combination with the spring-lever hook C, to pass through the ear and bear against the rear of the same, substantially as and for the purpose set forth.

LEON P. JEANNE.

Witnesses:
PAUL GOEPEL,
T. B. MOSHER.